(12) United States Patent
Galvin

(10) Patent No.: US 6,284,054 B1
(45) Date of Patent: Sep. 4, 2001

(54) ANIMAL WASTE SEPARATOR AND WASTE WATER RECYCLING SYSTEM AND METHOD OF RECYCLING WASTE WATER

(75) Inventor: William M. Galvin, Front Royal, VA (US)

(73) Assignee: Global Waste, Ltd., Abaco (BS)

( * ) Notice: Subject to any disclaimer, the term of this patent is extended or adjusted under 35 U.S.C. 154(b) by 0 days.

(21) Appl. No.: 09/501,316

(22) Filed: Feb. 10, 2000

Related U.S. Application Data

(60) Provisional application No. 60/149,425, filed on Aug. 18, 1999.

(51) Int. Cl.[7] .................. B08B 3/02; B08B 3/14; B08B 7/04
(52) U.S. Cl. .............. 134/10; 134/13; 134/104.4; 134/109; 134/110; 134/111
(58) Field of Search .................. 134/10, 13, 104.4, 134/109, 110, 111

(56) References Cited

U.S. PATENT DOCUMENTS

| | | | |
|---|---|---|---|
| 3,982,499 | * | 9/1976 | Frankl ................................ 119/16 |
| 4,338,337 | * | 7/1982 | Frankl ................................ 426/55 |
| 5,422,015 | * | 6/1995 | Angell et al. ..................... 210/751 |
| 5,647,977 | * | 7/1997 | Arnaud .............................. 210/167 |
| 6,117,324 | * | 9/2000 | Greene et al. ..................... 210/627 |

* cited by examiner

Primary Examiner—Zeinab El-Arini
(74) Attorney, Agent, or Firm—Swidler Berlin Shereff Friedman LLP

(57) ABSTRACT

The present invention is directed to a system and method for separating waste material from waste water for use in connection with the flushing of an animal storage pen (such as, for example, a hog barn) to remove the waste material from the animal storage pen such that the waste water is recycled. The system includes a fluid storage assembly for storing a supply of fluid for flushing the animal storage pen. The system also includes a large waste material separation assembly for separating large solid waste material from a waste water mixture flushed from the animal storage pen. After the large waste material has been separated from the waste water mixture, a small waste material separation assembly separates the small waste material from the waste water mixture such that the remaining waste water mixture is substantially free of waste material and pathogens. A waste water return assembly supplies waste water from the small waste material separation assembly to the fluid storage assembly. A solid waste storage assembly collects and stores the large solid waste separated from the waste water mixture and the small waste material separated from the waste water mixture.

11 Claims, 3 Drawing Sheets

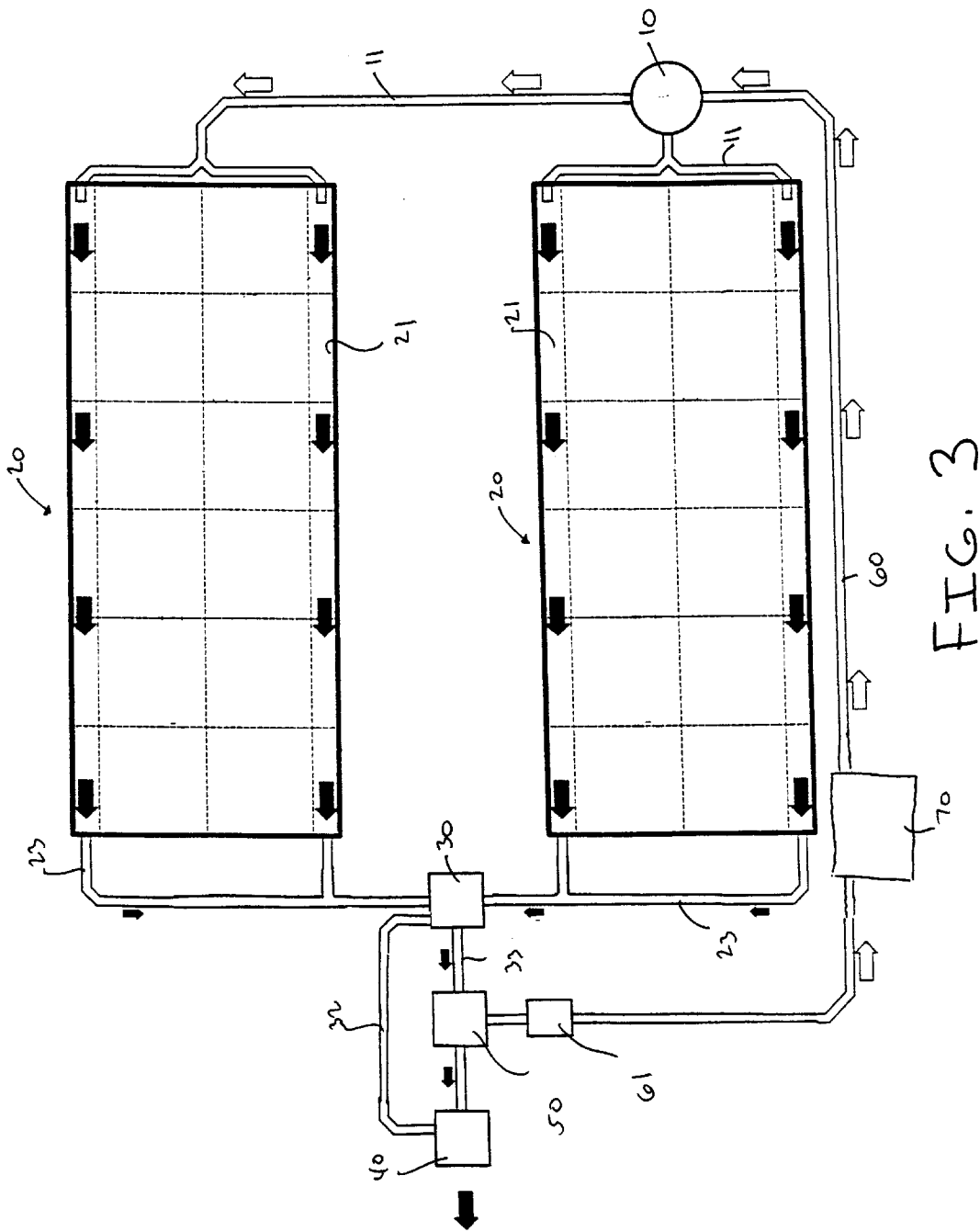

ANIMAL WASTE SEPARATOR AND WASTE WATER RECYCLING SYSTEM AND METHOD OF RECYCLING WASTE WATER

CROSS REFERENCE To RELATED APPLICATION

This application relates to and claims priority on U.S. Provisional Patent Application Ser. No. 60/149,425, filed on Aug. 18, 1999.

FIELD OF THE INVENTION

The present invention relates to a system and method for the separation of animal waste from waste water. The present invention also relates to a system and method for recycling and purifying the waste water. In particular, the present invention is directed to system for flushing and treating waste water from an animal storage pen using electrocoagulation to separate the animal waste from the waste water. The present invention is also directed to method for flushing and treating waste water from an animal storage pen using electrocoagulation.

BACKGROUND OF THE INVENTION

The growth of commercial hog production facilities has led to significant political and public resistance to their operation mainly as a result of hog waste concerns. Specifically, as hog production capacity has risen over the past years, so has the volume of hog sewage that must be safely contained and treated. Current waste control methods do not always adequately manage the waste, resulting in operations which are unsanitary, smelly, and costly to operate.

Current methods of handling hog waste by many producers typically involve the use of hog waste lagoons, which is simply a hollowed open area into which the material is pumped to allow settling of the solid matter to the bottom of the lagoon and dispersal of the liquid and gas content by evaporation. Raw hog waste, which is comprised generally of a solid component and a liquid component, is pumped into these lagoons and confined, allowing solar evaporation to slowly remove the volatile liquid component of the waste slurry. However, over time, the pathogen laden solids contained in the waste slurry begin to break down and liquefy, producing a large volume of pathogen rich liquid which constitutes an environmental hazard that is costly to treat. It is common practice to periodically remove the resulting liquefied solids from the lagoon and to spray or discharge the same on agricultural fields. Obviously, as the liquefied solids retain significant bacteria or other pathogens then the spraying or discharge of such onto agricultural land poses a serious health and safety risk to the public. The continuous evaporation of the liquid acts to discharge into the air noxious gases which leads to environmental pollution which is becoming politically unacceptable. The toxic leachates and their associated volatile organic compounds as well as offensive inorganic gases and vapors emanating from such lagoons are a major source of atmospheric pollution.

The lagoon can also leak so as to cause contamination of the ground water. The discharging of such waste into the ecological environment such as rivers, tributaries, and streams, pose immediate threats to drinking water, wildlife, vegetation and food sources.

OBJECTS OF THE INVENTION

It is therefore an object of the present invention to overcome the above-identified shortcomings of the prior art.

It is another object of the present invention to provide a system for recycling waste water.

It is another object of the present invention to provide a system for recycling waste water in which solid waste is removed.

It is another object of the present invention to provide a system for recycling waste water in which solid waste is removed using electrocoagulation.

It is another object of the present invention to provide a system for treating hog waste.

It is another object of the present invention to provide a system for treating hog waste whereby liquid waste is separated from solid waste.

It is a further object of the present invention to further purify the liquid waste such that purified water may be recycled.

It is a further object of the present invention to recycle the purified water for flushing an animal storage pen.

It is another object of the present invention to eliminate the need for lagoons to store animal waste.

It is another object of the present invention to separate solid animal waste from the waste water for subsequent treatment.

It is an object of the present invention to remove the solid animal waste from the waste water using electrocoagulation.

It is another object of the present invention to provide a method of flushing an animal storage pen using water whereby the solid animal waste is separated from the waste water.

It is another object of the present invention to remove ammonia from the waste water.

It is another object of the present invention to remove nitrates from the waste water.

It is yet another object of the present invention to provide a method of flushing an animal storage pen whereby purified waste water is recycled to the flush the storage pen.

SUMMARY OF THE INVENTION

The present invention is directed to a system for separating waste material from waste water for use in connection with the flushing of an animal storage pen (such as, for example, a hog barn) to remove the waste material from the animal storage pen such that the waste water is recycled. The system includes a fluid storage assembly for storing a supply of fluid for flushing the animal storage pen. The system also includes a large waste material separation assembly for separating large solid waste material from a waste water mixture flushed from the animal storage pen. After the large waste material has been separated from the waste water mixture, a small waste material separation assembly separates the small waste material from the waste water mixture such that the remaining waste water mixture is substantially free of waste material and pathogens. A waste water return assembly supplies waste water from the small waste material separation assembly to the fluid storage assembly. A solid waste storage assembly collects and stores the large solid waste separated from the waste water mixture and the small waste material separated from the waste water mixture. The waste material collected in the solid waste storage assembly may be disposed of by incineration or other suitable disposal methods. The present invention eliminates the need for lagoons housing waste material. The present invention further permits the recycling of water for flushing the animal storage pen, which results in a conservation of water resources.

In accordance with the present invention, the large waste material separation assembly may include at least one filtering assembly for separating the large solid waste material from the waste water mixture. The large waste material separation assembly may further include a transfer assembly for transferring the large solid waste material to the solid waste storage assembly.

In accordance with the present invention, the small waste material separation assembly may include at least one filter assembly for filtering larger sized waste material from the waste water mixture, and a coagulator assembly for separating the small waste material and pathogens from the waste water mixture. In a preferred form, the coagulator assembly is an electrocoagulator assembly having a plurality of electrodes. The small waste material separation assembly may further include a series of tanks for receiving the waste water mixture. A first tank may be located between the at least one filter assembly and the coagulator assembly. A second tank may be provided for receiving the waste water mixture from the coagulator assembly. A third tank may be provided for receiving the waste water mixture from the second tank. The purified waste water may be separated from a purified waste water mixture in the third tank. The purified waste water is returned to the fluid storage assembly through the waste water return assembly. The small waste material separation assembly may further include at least one filtering assembly for filtering the purified waste water mixture to remove any remaining solid waste material from the purified waste water mixture.

The present invention is also directed to a method for flushing waste material from an animal storage pen. The method includes the step of supplying a flow of fluid from a fluid supply through the animal storage pen to remove waste material from the animal storage pen. The method further includes the step of separating large waste material from the fluid. The method further includes the steps of separating small waste material and pathogens from the fluid and returning the fluid to the fluid supply.

In accordance with the present invention, the step of separating large waste material from the fluid includes the step of filtering large waste material out of the fluid.

In accordance with the present invention, the step of separating small waste material from the fluid may comprise the steps of filtering waste material out of the fluid, and separating waste material and pathogens from the fluid by coagulation. The step of separating waste material and pathogens from the fluid by coagulation may include separating waste material and pathogens from the fluid by electrocoagulation.

BRIEF DESCRIPTION OF THE DRAWINGS

The invention will now be described in conjunction with the following drawings in which like reference numerals designate like elements and wherein:

FIG. 3 is a schematic diagram of an animal waste separation and waste water recycling system according to another embodiment of the present invention.

DETAILED DESCRIPTION OF PREFERRED EMBODIMENTS

Figure 1:
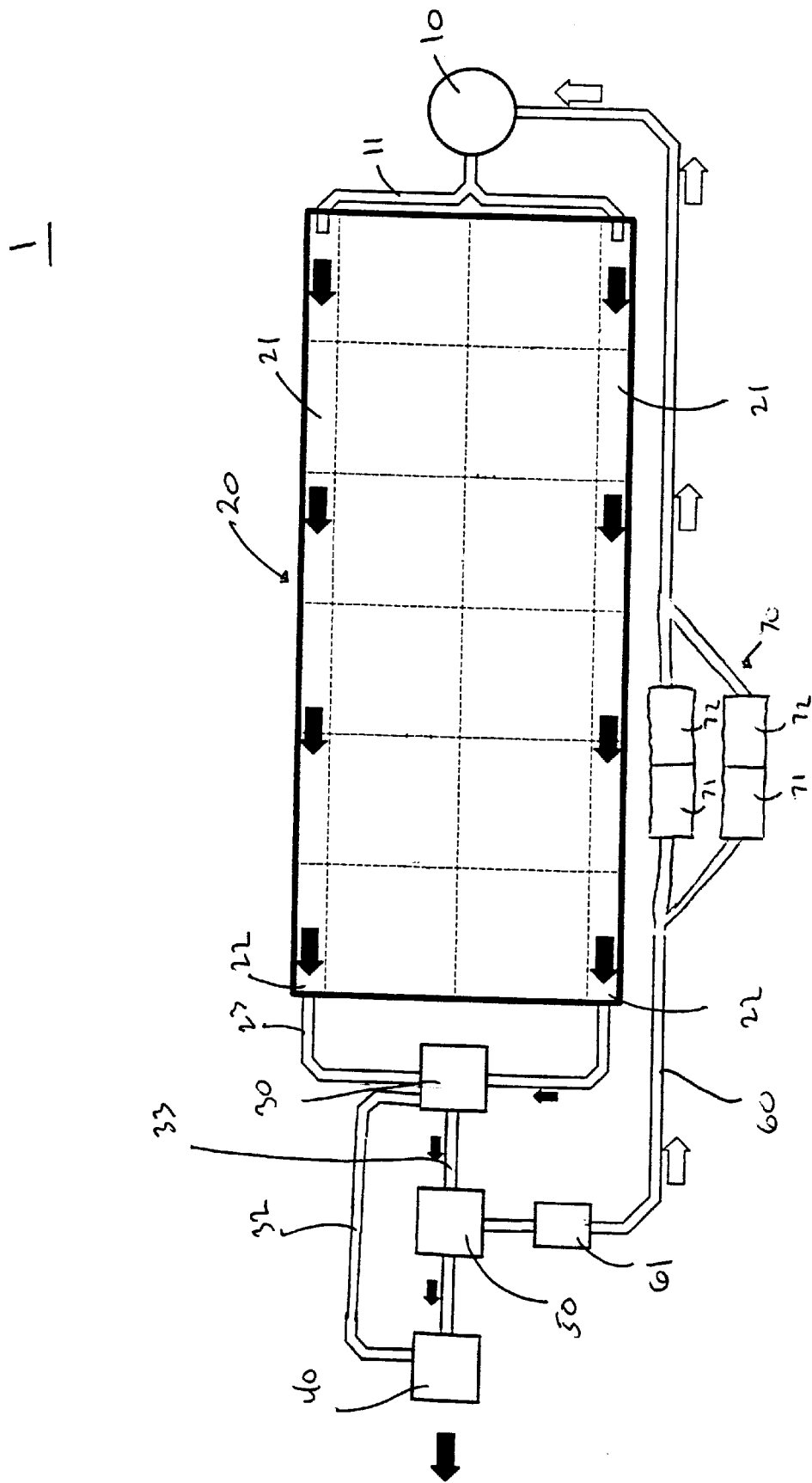
FIG. 1 is a schematic diagram of an animal waste separation and waste water recycling system according to an embodiment of the present invention.

An animal waste separator and waste water recycling system 1 according to an embodiment of the present invention is illustrated in FIG. 1. The system 1 will be described in connection with the separation of hog waste from water that is flushed through a hog barn. It, however, is contemplated by the present inventor that the system 1 may be used in connection with the separation of animal waste including but not limited to poultry, cattle, etc.

The system 1 includes at least one holding tank 10 for holding flush water. The flush water is used to flush and remove waste, dirt and/or food from an animal storage pen 20, such as for example, a hog barn. The holding tank 10 is connected to the storage pen 20 through a fluid passageway 11. At least one fluid passageway 11 extends from the holding tank 10 to the storage pen 20. The storage pen 20 includes at least one waste trough 21 extending through the pen 20. Each waste trough 21 is connected to a fluid passageway 11. Animal waste, dirt and uneaten food collect within the waste trough 21, water from the holding tank 10 may then be flushed through the waste trough 21 to remove the waste material from the pen 20. It is preferred that each waste trough 21 be tilted or slanted to facilitate drainage of the waste material towards a drainage end 22 of the pen 20.

Each waste trough 21 is connected through a fluid passageway 23 to a solid waste separator assembly 30. The waste water mixture containing the waste material flushed from the waste troughs 21 is fed through the solid waste separator assembly 30. In the solid waste separator assembly 30, large sized solid waste is separated from the waste water mixture. The separated solid waste in then transferred to a solid waste receptacle 40.

Figure 2:
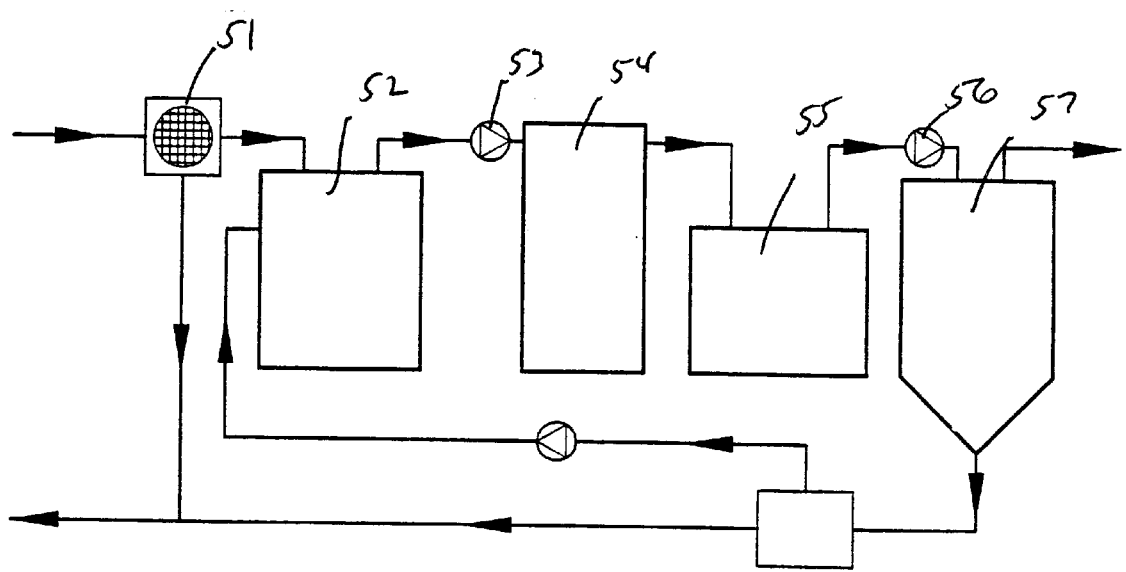
FIG. 2 is a schematic diagram of the separation assembly of the waste water recycling system of FIG. 1.

The separator assembly 30 preferably includes at least one filter 31 for separating the large sized solid waste from the waste water mixture, as shown in FIG. 2. Each filter 31 includes at least one screen assembly having openings therein that are sized to permit the passage of the waste water mixture and smaller sized solid waste. In a preferred embodiment, each screen assembly is motorized. The movement and/or vibration of the screen assembly prevents waste from sticking to the separator assembly 30. The separator assembly 30 further includes an assembly for removing the collected solid waste from the at least one filter.

The separator assembly 30 further includes a transporting assembly 32 for transporting the large sized solid waste to the solid waste receptacle 40. The transporting assembly 32 may include a conveyor belt assembly to transport the solid waste to the receptacle 40. The present invention, however, is not limited to a conveyor belt assembly; rather, it is contemplated that other suitable assemblies and means may be used to transport the large sized solid waste to be well within the scope of the present invention. For example, the solid waste receptacle 40 may be positioned below the separator assembly 30 such that the force of gravity may be used to transfer the solid waste to the receptacle 40.

A fluid passageway 33 extends from the separator assembly 30 to a coagulator assembly 50. The coagulator assembly 50 is preferably an electrocoagulator 50.

The coagulator assembly 50 will be described in connection with FIG. 2. The coagulator assembly 50 is connected to the separator assembly 30 through fluid passageway 33. The waste water mixture is passed through at least one filtering assembly 51. The filtering assembly 51 removes larger sized waste materials that passed through the separator assembly 30. The filtered waste water mixture is then stored in a surge tank 52. The waste water mixture is then transferred from the surge tank 52 using pumping assembly 53 to a coagulation chamber 54. As described above in connection with the separator assembly 30, the filtering assembly 51 may also be motorized to prevent solid waste from sticking. The filtering assembly 51 further includes an assembly for removing the collected solid waste. The collected solid waste is transferred to the solid waste receptacle 40.

In the coagulation chamber 54, an electrical current is passed through waste water mixture to induce a chemical reaction by neutralizing ion and particle charges. This chemical reaction cause the destabilization of most dissolved and nondissolved materials, including heavy metals, cyanide, emulsified fats, oil, grease, mixed waste effluents, suspended solids, complex organics, oily emulsions in water, bacteria, viruses, and cysts. Destabilization of materials results in the formation floc precipitates that are then easily separated from the water at a rate of 90–99% even with high flow applications.

The waste water mixture is then transferred to a development tank 55. The development tank 55 is a holding tank for the waste water mixture where floc precipitates continue to form. The waste water mixture is then transferred to a clarifier tank 56 using a pumping assembly 57. In the clarifier tank 56, the floc precipitates of waste material are separated from the purified waste water. The floc precipitates are transferred to the solid waste receptacle 40. The purified waste water is returned to the holding tank 10 through a water return assembly 60. The water return assembly 60 preferably includes a pumping assembly 61 for pumping the purified waste water to the holding tank 10. The purified waste water may not be potable. Prior to transfer to the holding tank 10, it is desirable to further treat the purified waste water to remove ammonia and nitrates. A purification system 70 may be included in the water return assembly 60 to remove the ammonia and nitrates. The water may be pumped to a first reaction chamber 71 containing a mineral reactant. The ammonia reacts with the mineral reactant, which results in its removal from the purified waste water. The water is then pumped to a second reaction chamber 72 containing another mineral reactant. The nitrates react with the mineral reactant in the second reaction chamber 72, which results in its removal from the purified waste water. The purified waste water is then transferred to the holding tank 10.

It is preferred that the system 70 include two parallel systems (i.e., side by side systems having a first reaction chamber 71 and a second reaction chamber 72). With this arrangement, one system can be cleansed while the other is operational. The first and second reaction chambers 71 and 72 may be cleansed using a chemical solution which reverses the above-described reaction with the mineral reactants. The chemical solution may then be disposed of in, for example, receptacle 40. Waste water can be diverted from one system to another during the cleaning process.

While this invention has been described in conjunction with specific embodiments thereof, it is evident that many alternatives, modifications and variations will be apparent to those skilled in the art. For example, a variation of the system 1 is illustrated in FIG. 3. The system 2, shown in FIG. 3, is adapted for use with multiple storage pens 20. In this embodiment, a single separator assembly 30, waste receptacle 40 and coagulator assembly 50 are shown. It, however, is contemplated by the present inventor that multiple assemblies may be provided. Accordingly, the preferred embodiments of the invention as set forth herein are intended to be illustrative, not limiting. Various changes may be made without departing from the spirit and scope of the invention as defined in the following claims.

What is claimed is:

1. A system for separating waste material from waste water for use in connection with flushing of an animal storage pen to remove the waste material from the animal storage pen such that the waste water is recycled, said system comprising:
   fluid storage means for storing a supply of fluid for flushing the animal storage pen;
   large waste material separation means for separating large solid waste material from a waste water mixture flushed from the animal storage pen;
   small waste material separation means for separating small waste material from the waste water mixture such that remaining waste water mixture is substantially free of waste material and pathogens:
   waste water return means for supplying waste water from said small waste material separation means to said fluid storage means; and
   solid waste storage means for storing the large solid waste separated from the waste water mixture and the small waste material separated from the waste water mixture,
   wherein said small waste material separation means comprises at least one filter assembly for filtering larger sized waste material from the waste water mixture, and a coagulator assembly for separating the small waste material and pathogens from the waste water mixture, and
   wherein said coagulator assembly is an electrocoagulator assembly having a plurality of electrodes.

2. The system for separating waste material from waste water according to claim 1, wherein said large waste material separation means comprises at least one filtering assembly for separating the large solid waste material from the waste water mixture.

3. The system for separating waste material from waste water according to claim 2, wherein said large waste material separation means further comprises transfer means for transferring the large solid waste material to said solid waste storage means.

4. The system for separating waste material from waste according to claim 1, further comprising a first tank for receiving said waste water mixture, said tank being located between said at least one filter assembly and said coagulator assembly.

5. The system for separating waste material from waste water according to claim 4, further comprising a second tank for receiving the waste water mixture from said coagulator assembly.

6. The system for separating waste material from waste water according to claim 5, further comprising a third tank for receiving said waste water mixture from said second tank, wherein purified waste water is separated from a purified waste water mixture, wherein said purified waste water is returned to said fluid storage means through said waste water return means.

7. The system for separating waste material from waste water according to claim 6, further comprising at least one filtering assembly for filtering the purified waste water mixture to remove any remaining solid waste material from the purified waste water mixture.

8. The system according to claim 1, further comprising removal means for removing at least one of ammonia and nitrates from the waste water.

9. A method for flushing waste material from an animal storage pen, said method comprising the steps of:
   supplying a flow of fluid from a fluid supply through the animal storage pen to remove waste material from the animal storage pen;
   separating large waste material from the fluid;
   separating small waste material and pathogens from the fluid by coagulation,
   returning the fluid to the fluid supply,
   wherein said step of separating small waste material from the fluid comprises the steps of filtering waste material out of the fluid and separating waste material and pathogens from the fluid by coagulation, and wherein said step of separating waste material and pathogens from the fluid by coagulation includes separating waste material and pathogens from the fluid by electrocoagulation.

10. The method for flushing waste material from an animal storage pen according to claim 9, further comprising the step of removing at least one of ammonia and nitrates from the waste water.

11. The method for flushing waste material from an animal storage pen according to claim 9, wherein said step of separating large waste material from the fluid includes the step of filtering large waste material out of the fluid.

* * * * *